July 28, 1931.          W. H. HILL          1,816,432
INTERNAL COMBUSTION ENGINE
Filed Feb. 7, 1929

Inventor
William H. Hill
By Harry Frease
Attorney

Patented July 28, 1931

1,816,432

UNITED STATES PATENT OFFICE

WILLIAM H. HILL, OF CANTON, OHIO

INTERNAL COMBUSTION ENGINE

Application filed February 7, 1929. Serial No. 338,233.

The invention relates to internal combustion engines and especially to the design and arrangement of the combustion chamber.

In the usual type of combustion chamber such as is in general use, the mixture after compression is ignited by a spark produced by a spark plug within the combustion chamber and the flame radiates more or less from the spark plug, raising the pressure and consequently the temperature of the unburned portion of the mixture as the flame progresses. This unburned portion, under this high temperature, is catalytically disassociated where it contacts with the combustion chamber walls.

As the disassociation occurs, a great amount of radiant energy is liberated which is realized as extreme heat and actinic rays (ultra-violet).

This energy causes the unburned portion not in contact with the walls to be ignited internally, causing an instantaneous explosion of this portion which, being burned under constant volume conditions, produces extreme momentary pressure which is manifested as a "knock".

The disassociation of the hydrocarbon causes a separation and deposition of molecular carbon which to a certain extent is left on the combustion chamber walls.

Now, therefore, if the unburned, high temperature portion is isolated from the combustion chamber walls before disassociation can take place, this portion can be burned normally under higher temperature conditions, and if it detonates, i. e., burns internally, the excessive momentary pressure is cushioned by the enveloping gases.

The object of the improvement is to provide a combustion chamber which will permit the use of a much higher compression than is common in engines now in general use and which will at the same time eliminate detonation or knocks and consequently eliminate the formation of carbon on the piston and walls of the combustion chamber.

The above and other objects may be attained by providing a substantially central initial combustion chamber where the ignition of the first portion of the mixture is produced at the point of highest temperature, preferably over or near the center of the piston; a radial passage extending from the initial chamber and communicating tangentially to an annular secondary chamber which may be a complete annulus or only a portion of an annulus as desired.

A further object is to so construct the engine that the walls of this secondary, annular chamber are formed partly in the piston, partly in the cylinder and the remainder in the head of the cylinder.

Figure 1:
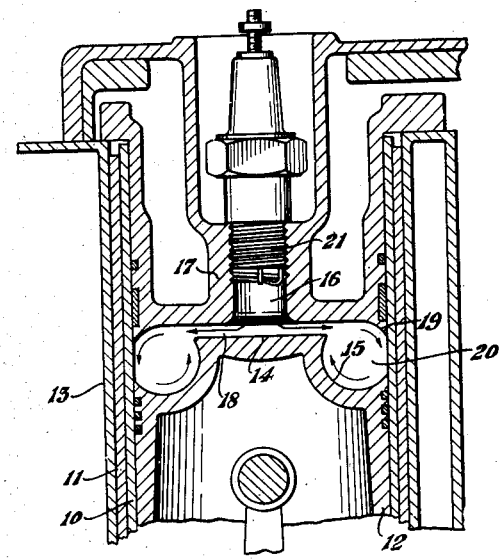
Figure 2:
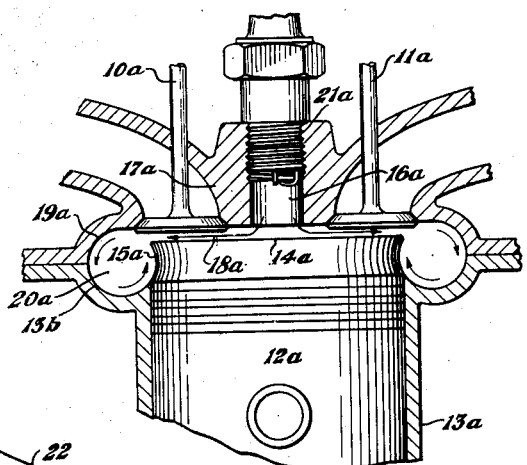
Figure 3:
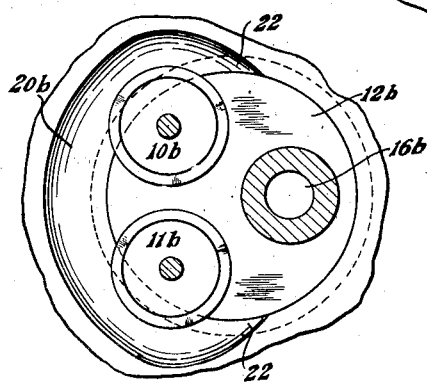

An embodiment of the invention is illustrated in the accompanying drawings, in which Figure 1 is a sectional elevation of the upper portion of one cylinder of an internal combustion engine of the sleeve valve type, constructed in accordance with the invention;

Fig. 2, a similar view showing the application of the invention to an overhead valve type of engine; and Fig. 3, a fragmentary plan sectional view through an overhead valve type engine, showing the secondary chamber in the form of a partial annulus.

Similar numerals refer to similar parts throughout the drawing.

Referring first to Fig. 1 of the drawings, the invention is shown as applied to a sleeve valve motor in which the inner and outer sleeves 10 and 11 may be of usual construction and slidably mounted around the piston 12 and within the cylinder 13.

The piston head may have the central flat portion 14 and the annular recess 15 surrounding the same and extending to the periphery of the piston to form a portion of the wall of the secondary combustion chamber to be later described.

The initial combustion chamber 16 is centrally located within the cylinder head 17, the lower wall of which is substantially flat, forming, with the flat portion 14 of the piston head, a flat passage 18 communicating radially with the central or initial combustion chamber 16.

The downwardly curved peripheral rim portion 19 is provided upon the cylinder head and, together with the annular curved portion 15 of the piston and the inner surface of the sleeve 10, forms an annular secondary combustion chamber 20 substantially circular in cross section, the flat radial passage 18 communicating tangentially therewith as shown in Fig. 1.

The complete combustion chamber thus comprises the central initial chamber 16, the radial passage 18 and the annular secondary chamber 20, a spark plug, as shown at 21, being located in the initial chamber, directly over the center of the piston and in the hottest portion of the entire combustion chamber.

As the charge is compressed by the upward movement of the piston, the greater portion of the mixture will be forced from the initial chamber, through the flat radial passage 18, into the secondary chamber in which it will be rapidly rotated in the direction of the arrows shown on the drawings, at the instant of firing.

When the spark is fired, the mixture within the initial chamber will ignite first and will be burned under the initial compression pressure, the pressure gradually rising, but before it reaches the detonation stage, the flame will be projected through the radial passage 18 into the secondary chamber, wherein the mixture will be burned by the sheet of flame issuing from the initial chamber and enveloping the central portion of the mixture in the secondary chamber, while the same is in a high state of rotation, which will be accelerated by the expansion of the burnt gases from the initial chamber.

Thus the mixture in the secondary chamber will be ignited by a sheet of flame enveloping the central portion of the mixture and insulating the same from the walls of the chamber during the combustion at the higher pressure developed.

Fig. 2 of the drawings shows the application of the invention to an overhead valve type of engine. In this form of the invention the piston is shown at 12a and the cylinder at 13a, the head of the piston being flat as shown at 14a and provided with the annular groove or recess at its peripheral portion as indicated at 15a.

The initial combustion chamber 16a is substantially centrally located in the cylinder head 17a and provided with the usual spark plug 21a substantially over the center of the piston and in the hottest portion of the entire combustion chamber.

The radial passage 18a is formed between the flat head 14a of the piston and the under side of the cylinder head and communicates tangentially with the annular secondary chamber 20a, the walls of which are formed partly by the annular curved portion 15a of the piston, partly by the annular concaved portion 13b of the cylinder and the remainder by the annular curved portion 19a of the cylinder head. The usual poppet valves 10a and 11a are provided for inlet and exhaust in usual manner.

In the operation of this type of engine, the ignition will take place in the manner as above described regarding Fig. 1, the mixture being initially ignited in the central or initial chamber, the flame being projected through the radial passage into the secondary chamber where it will envelop the central portion of the mixture while in a high state of rotation, which is accelerated by expansion of burnt gases from the initial chamber.

In each of the forms above described, the secondary chamber is shown as a complete annulus entirely surrounding the piston but it should be understood that the invention may be carried out by forming the secondary chamber as only a partial annulus in the manner illustrated at 20b in Fig. 3, this secondary chamber extending only a portion of the way around the piston 12b and terminating at each end in the tapered end portions 22 communicating at their extreme ends with the radial passage which is provided in the same manner as above described, to form communication between the initial chamber 16b and the secondary chamber 20b.

The valves 10b and 11b, of usual construction, may be provided for the inlet and exhaust and otherwise the engine may be substantially as illustrated and described with reference to Fig. 2.

By providing the tapered ends to the secondary chamber, the mixture will be caused to rotate therein throughout the entire length of the chamber and there being no straight or dead ends to the secondary chamber, all portions of the unburned mixture therein will be enveloped by the rotating flame and held out of contact with the walls during the explosion.

I claim:

1. An internal combustion engine including a cylinder provided with a head having an initial combustion chamber formed therein, a piston reciprocating in the cylinder, the cylinder, head and piston forming a peripheral secondary combustion chamber terminating in tapered end portions, the head and piston when at the upper limit of its stroke forming a flat passage communicating radially with the initial chamber and communicating tangentially with the secondary chamber.

2. An internal combustion engine including a cylinder provided with a head having an initial combustion chamber formed therein, a piston reciprocating in the cylinder, the cylinder, head and piston forming a peripheral secondary combustion chamber terminating in tapered end portions, the head and piston when at the upper limit of its stroke forming a flat passage communicating radially with the initial chamber and communicating tangentially with the secondary chamber, and communicating with the tapered end portions of the secondary chamber.

3. An internal combustion engine including a cylinder provided with a head having an initial combustion chamber formed therein, the cylinder, head and piston forming a peripheral secondary combustion chamber of substantially circular cross section, the head and piston when at the upper limit of its stroke forming a flat passage communicating radially with the initial chamber and communicating tangentially with the secondary chamber.

4. An internal combustion engine including a cylinder provided with a head having an initial combustion chamber formed substantially centrally therein, the cylinder, head and piston forming a peripheral secondary combustion chamber of substantially circular cross section, the head and piston when at the upper limit of its stroke forming a flat passage communicating radially with the initial chamber and communicating tangentially with the secondary chamber.

5. An internal combustion engine including a cylinder provided with a head having an initial combustion chamber formed therein, spark ignition means within the initial chamber, the cylinder, head and piston forming a peripheral secondary combustion chamber of substantially circular cross section, the head and piston when at the upper limit of its stroke forming a flat passage communicating radially with the initial chamber and communicating tangentially with the secondary chamber.

6. An internal combustion engine including a cylinder provided with a head having an initial combustion chamber formed therein, the cylinder, head and piston forming a peripheral secondary combustion chamber of greater volume than the initial chamber, the head and piston when at the upper limit of its stroke forming a flat passage communicating radially with the initial chamber and communicating tangentially with the secondary chamber.

7. An internal combustion engine including a cylinder provided with a head having an initial combustion chamber formed therein, a piston reciprocating in the cylinder, the piston, cylinder and head having peripheral recesses adapted to form a secondary combustion chamber of substantially circular cross section, the head and piston when at the upper limit of its stroke forming a flat passage communicating radially with the initial chamber and communicating tangentially with the secondary chamber.

In testimony that I claim the above, I have hereunto subscribed my name.

WILLIAM H. HILL.